(12) United States Patent
Jindal et al.

(10) Patent No.: US 10,728,255 B2
(45) Date of Patent: Jul. 28, 2020

(54) SYSTEM AND METHOD FOR PROTECTION OF ENTITIES ACROSS AVAILABILITY ZONES

(71) Applicant: Nutanix, Inc., San Jose, CA (US)

(72) Inventors: Ankush Jindal, Bangalore (IN); Sudish Kumar Sah, Bangalore (IN); Bharath Kumar Beedu, Bangalore (IN); Naveen Kumar, Bangalore (IN); Ganesh Sahukari, Bangalore (IN); Pranay Ega, San Jose, CA (US)

(73) Assignee: NUTANIX, INC., San Jose, CA (US)

( * ) Notice: Subject to any disclaimer, the term of this patent is extended or adjusted under 35 U.S.C. 154(b) by 143 days.

(21) Appl. No.: 16/140,492

(22) Filed: Sep. 24, 2018

(65) Prior Publication Data

US 2020/0099692 A1    Mar. 26, 2020

(51) Int. Cl.
*H04L 29/06* (2006.01)
*G06F 9/455* (2018.01)
*G06F 16/11* (2019.01)

(52) U.S. Cl.
CPC ........ *H04L 63/104* (2013.01); *G06F 9/45558* (2013.01); *G06F 16/128* (2019.01); *H04L 63/20* (2013.01); *G06F 2009/45562* (2013.01); *G06F 2009/45587* (2013.01)

(58) Field of Classification Search
CPC ..... H04L 63/104; H04L 63/20; G06F 16/128; G06F 9/45558; G06F 2009/45567; G06F 2009/45587
USPC .......................................................... 726/1
See application file for complete search history.

(56) References Cited

U.S. PATENT DOCUMENTS

| | | |
|---|---|---|
| 7,093,086 B1 | 8/2006 | Van Rietschote |
| 7,725,671 B2 | 5/2010 | Prahlad et al. |
| 7,840,533 B2 | 11/2010 | Prahlad et al. |
| 7,992,031 B2 | 8/2011 | Chavda et al. |
| 8,447,728 B2 | 5/2013 | Prahlad et al. |
| 8,549,518 B1 | 10/2013 | Aron et al. |
| 8,601,473 B1 | 12/2013 | Aron et al. |

(Continued)

OTHER PUBLICATIONS

Upreti, Vijay Shankar. "Additional Examples—Cluster Configurations." Oracle Solaris and Veritas Cluster. Apress, Berkeley, CA, 2016. 267-276. (Year: 2016).*

(Continued)

*Primary Examiner* — Syed A Zaidi
(74) *Attorney, Agent, or Firm* — Foley & Lardner LLP

(57) ABSTRACT

A system and method for protecting entities of an availability zone include creating, by a policy engine associated with a virtual computing system, a protection policy definition for replicating a first set of entities of a first availability zone of the virtual computing system to a second availability zone of the virtual computing system. Each of the first set of entities is associated with a first common tag and the first set of entities are spread across first multiple clusters of the first availability zone. The system and method further include capturing, by the policy engine, a first plurality of snapshots of each of the first set of entities in the first availability zone in accordance with a first recovery point objective parameter and storing, by the policy engine, at least one copy of the first plurality of snapshots in the second availability zone.

26 Claims, 6 Drawing Sheets

(56) References Cited

U.S. PATENT DOCUMENTS

| | | | |
|---|---|---|---|
| 8,631,283 B1* | 1/2014 | Sivasubramanian | G06F 9/5061 714/47.1 |
| 8,762,335 B2 | 6/2014 | Prahlad et al. | |
| 8,850,130 B1 | 9/2014 | Aron et al. | |
| 9,740,723 B2 | 8/2017 | Prahlad et al. | |
| 9,772,866 B1 | 9/2017 | Aron et al. | |
| 9,823,973 B1* | 11/2017 | Natanzon | G06F 3/0617 |
| 10,025,679 B2 | 7/2018 | Garlapati et al. | |
| 10,210,048 B2 | 2/2019 | Sancheti | |
| 10,248,657 B2 | 4/2019 | Prahlad et al. | |
| 2012/0054396 A1* | 3/2012 | Bhattacharya | G06F 13/385 710/300 |
| 2012/0124311 A1* | 5/2012 | Winokur | G06F 11/1474 711/162 |
| 2012/0233117 A1* | 9/2012 | Holt | G06F 16/1748 707/620 |
| 2013/0227236 A1* | 8/2013 | Flynn | G06F 3/061 711/165 |
| 2013/0339295 A1* | 12/2013 | Dean | G06F 3/0617 707/610 |
| 2013/0339301 A1* | 12/2013 | Saito | G06F 16/10 707/649 |
| 2014/0201642 A1* | 7/2014 | Vicat-Blanc | H04L 41/22 715/736 |
| 2014/0258229 A1* | 9/2014 | Verbitski | G06F 16/273 707/634 |
| 2014/0279930 A1* | 9/2014 | Gupta | G06F 11/1464 707/683 |
| 2014/0279931 A1* | 9/2014 | Gupta | G06F 16/2358 707/683 |
| 2015/0215163 A1* | 7/2015 | Kowalski | G06F 11/0709 714/4.1 |
| 2015/0220561 A1* | 8/2015 | Goetz | G06F 16/178 707/827 |
| 2015/0370637 A1* | 12/2015 | Molaro | H03M 13/1515 714/766 |
| 2016/0085643 A1* | 3/2016 | McAlister | G06F 11/203 714/4.12 |
| 2016/0253249 A1* | 9/2016 | Tang | G06F 11/2028 714/4.12 |
| 2016/0323377 A1 | 11/2016 | Einkauf et al. | |
| 2017/0139791 A1* | 5/2017 | Hagan | H04L 67/1095 |
| 2017/0255409 A1* | 9/2017 | Brooker | G06F 3/0631 |
| 2018/0032399 A1* | 2/2018 | Johnson | G06F 11/0709 |
| 2018/0262563 A1 | 9/2018 | Mohammed et al. | |
| 2019/0012357 A1* | 1/2019 | Schreter | H04L 67/2842 |
| 2019/0129745 A1* | 5/2019 | Wang | G06F 9/45558 |
| 2019/0332268 A1* | 10/2019 | Greenwood | G06F 11/1451 |

OTHER PUBLICATIONS

Rashmi Ranjana TP, Jayalakshmi DS, Srinivasan R. On Replication Strategies for Data Intensive Cloud Applications. 2015. (Year: 2015).*
Bassek, Christian, Samuel Pierre, and Alejandro Quintero. "Redundancy schemes for high availability computer clusters." Journal of Computer Science 2.1 (2006): 33-47. (Year: 2006).*
NPL Search Results (Year: 2020).*
Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jan. 12, 2016), from https://nutanixbible.com/.
Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jun. 25, 2018), from https://nutanixbible.com/.
Poitras, Steven. "The Nutanix Bible" (Jan. 3, 2017), from https://nutanixbible.com/.
Poitras, Steven. "The Nutanix Bible" (Jan. 3, 2018), from https://nutanixbible.com/.
Poitras, Steven. "The Nutanix Bible" (Sep. 4, 2015), from https://nutanixbible.com/.
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 8, 2017), from https://nutanixbible.com/.
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Jun. 9, 2016), from https://nutanixbible.com/.
A. Raghavan, A. Chandra, J. B. Weissman, 'Tiera: Towards Flexible Multi-Tiered Cloud Storage Instances,' Middleware ACM, 2014.
Barr, Jeff. "EBS Snapshot Copy (Between Regions)" (accessed Sep. 13, 2019) from https://aws.amazon.com/blogs/aws/ebs-snapshot-copy/ (published Dec. 18, 2012).
Cano, Ignacio, et al. "Curator: Self-Managing Storage for Enterprise Clusters" (Mar. 27, 2017), from https://www.usenix.org/conference/nsdi17/.
Github Contributors. "What are Availability Zones in Azure?" (accessed Sep. 13, 2019) from https://docs.microsoft.com/en-us/azure/availability-zones/az-overview (published Aug. 6, 2019).
Perry, Yifat. "Azure Availability Zones: An In-Depth Look" (accessed Sep. 13, 2019) from https://cloud.netapp.com/blog/azure-availability-zones-an-in-depth-look (published Sep. 5, 2019).

* cited by examiner

400

Name

PR2                                                   405

Primary Location

Local AZ                                              410

Recovery Location

PC_10.5.150.7                                         415

420

Target Cluster ?

autoselect (recommended)

autoselect (recommended) — 430
— 425
noche-3

— 435

Recovery Point Objective                    Start immediately  Change

Hours    440                              1    445

Retention Policy — 450
● Linear — 455
○ Roll-up — 460

Remote Retention — 465

| − | 1 | + |   Recovery Point

Local Retention — 470

| − | 1 | + |   Recovery Point

☐ Take App-Consistent Recovery Point ?

— 475

Protect VMs based on categories ?              480 — Update

| Name | Value |
| colors | blue |

490

495 —— Cancel    Save

FIG. 4A

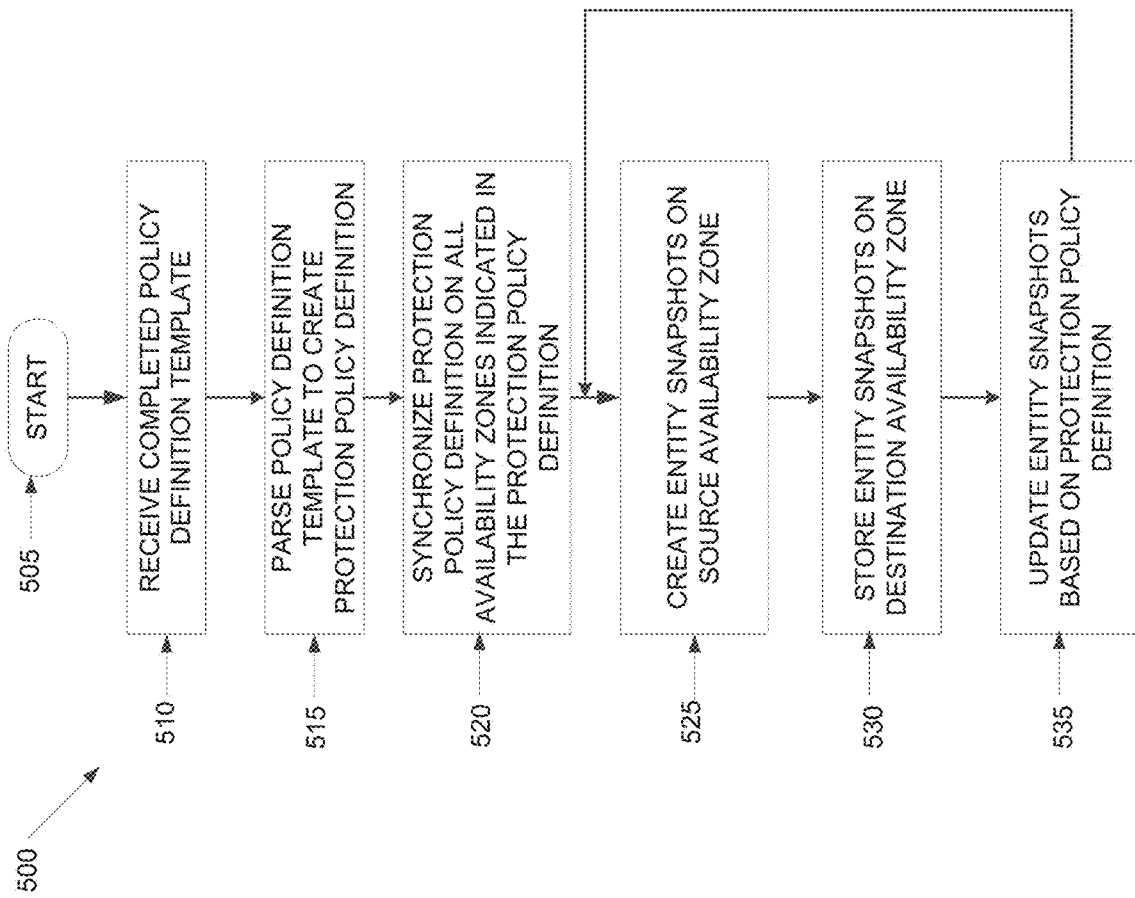

SYSTEM AND METHOD FOR PROTECTION OF ENTITIES ACROSS AVAILABILITY ZONES

BACKGROUND

The following description is provided to assist the understanding of the reader. None of the information provided or references cited is admitted to be prior art.

Virtual computing systems are widely used in a variety of applications. Virtual computing systems include one or more host machines running one or more virtual machines concurrently. The virtual machines utilize the hardware resources of the underlying host machines. Each virtual machine may be configured to run an instance of an operating system. Modern virtual computing systems allow several operating systems and several software applications to be safely run at the same time on the virtual machines of a single host machine, thereby increasing resource utilization and performance efficiency. However, the present day virtual computing systems have limitations due to their configuration and the way they operate.

SUMMARY

In accordance with some aspects of the present disclosure, a method is disclosed. The method includes creating, by a policy engine associated with a virtual computing system, a protection policy definition for replicating a first set of entities of a first availability zone of the virtual computing system to a second availability zone of the virtual computing system. Each of the first set of entities is associated with a first common tag and entities in the first set of entities are spread across first multiple clusters of the first availability zone. The method also includes capturing, by the policy engine, a first plurality of snapshots of each of the first set of entities in the first availability zone. Each of the first plurality of snapshots is captured in accordance with a first recovery point objective parameter. The method additionally includes storing, by the policy engine, at least one copy of the first plurality of snapshots in the second availability zone.

In accordance with some other aspects of the present disclosure, a system is disclosed. The system includes a plurality of availability zones in a virtual computing system, including a first availability zone and a second availability zone. The system also includes a policy engine associated with the virtual computing system. The policy engine includes a memory to store a protection policy definition to protect entities in the plurality of availability zones and a processing unit. The processing unit is configured to create the protection policy definition for replicating a first set of entities of the first availability zone to the second availability zone, including storing the protection policy definition within the memory. Each of the first set of entities is associated with a first common tag and entities in the first set of entities are spread across multiple clusters of the first availability zone. The processing unit is also configured to capture a first plurality of snapshots of each of the first set of entities in the first availability zone. Each of the first plurality of snapshots is captured in accordance with a recovery point objective parameter. The processing unit is further configured to store at least one copy of the first plurality of snapshots in the second availability zone.

In accordance with yet other aspects of the present disclosure, a non-transitory computer readable media with computer-executable instructions embodied thereon is disclosed. The instructions when executed by a processor of a policy engine associated with a virtual computing system cause the policy engine to perform a process. The process includes creating a protection policy definition for replicating a first set of entities of a first availability zone of the virtual computing system to a second availability zone. Each of the first set of entities is associated with a first common tag and entities in the first set of entities are spread across first multiple clusters of the first availability zone. The process also includes capturing a first plurality of snapshots of each of the first set of entities in the first availability zone. Each of the first plurality of snapshots is captured in accordance with a first recovery point objective parameter. The process further includes storing at least one copy of the first plurality of snapshots in the second availability zone.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

FIG. 4A is an example policy definition template for creating and implementing a protection policy definition by a policy engine of the protection system of FIGS. 2 and 3, in accordance with some embodiments of the present disclosure.

FIG. 5 is an example flowchart outlining operations for creating and implementing the protection policy definition by the policy engine, in accordance with some embodiments of the present disclosure.

Figure 1:
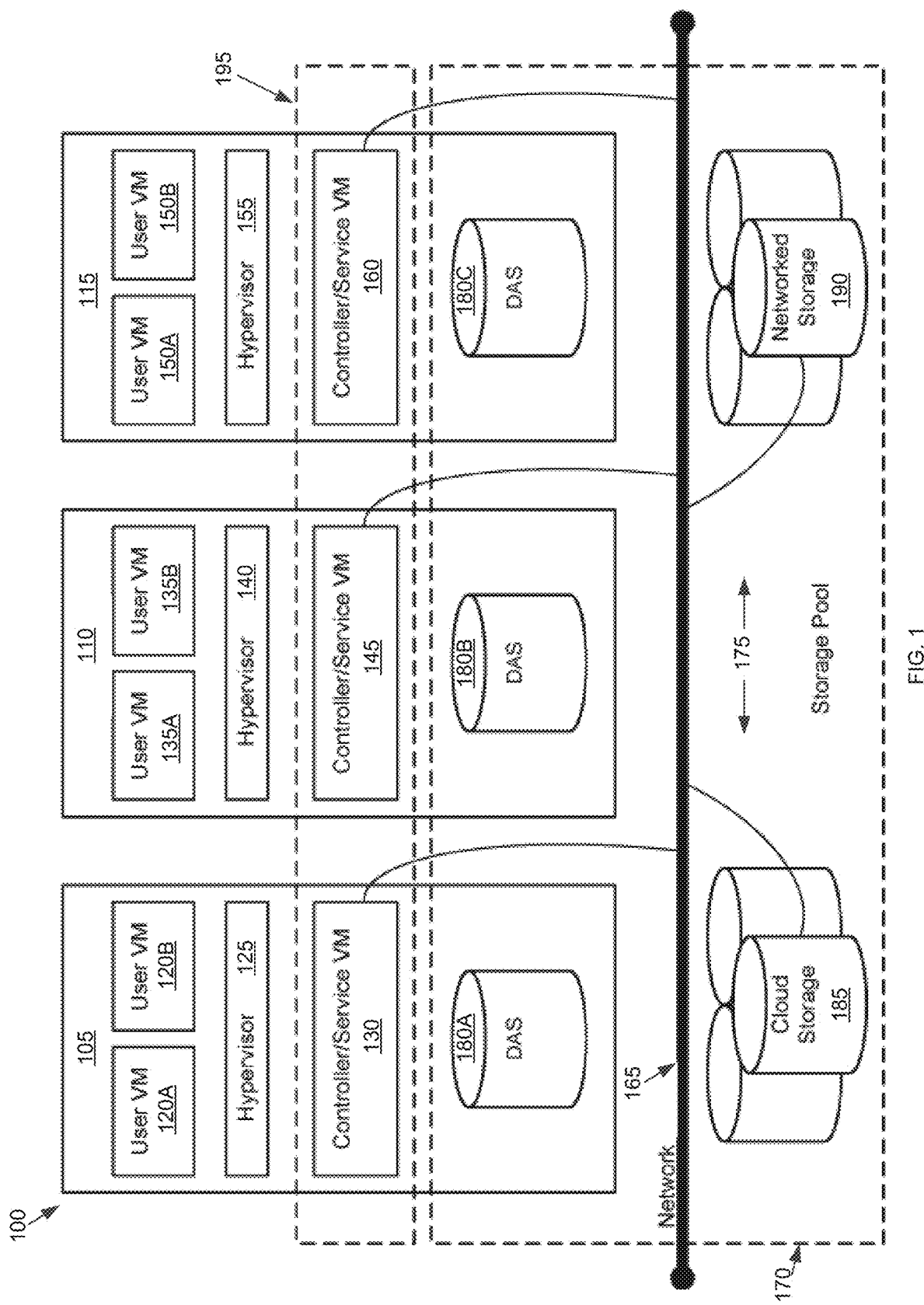
FIG. 1 is an example block diagram of a cluster of a virtual computing system, in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

The present disclosure is generally directed to a protection system of a virtual computing system. The protection system includes a plurality of availability zones operably connected with one another. Each of the plurality of availability zones includes a plurality of clusters, with each of the plurality of clusters having a plurality of nodes. Each of the plurality of nodes includes one or more virtual machines and other entities managed by an instance of a virtual machine monitor such as a hypervisor. These and other components of the availability zone may be part of a datacenter, which may be managed by a user (e.g., an administrator or other authorized personnel). The protection system is configured to protect entities by replicating from one of the plurality of availability zones to another one of the plurality of availability zones. By replicating the entities amongst the plurality of availability zones, if a particular one of the plurality of availability zones becomes non-operational for some reason, a replicated copy of the entities of the non-operational availability zone may be accessed from another one of the plurality of availability zones. Thus, the protection system maintains a continuity of operation of the entities in the aftermath of a disaster condition.

The disaster condition may include planned outages, performance related failures, component failures, power failures, natural calamities, or any other condition that hampers the normal operation of entities in a particular availability zone or a portion of a particular availability zone. Generally speaking and as used herein, a disaster condition is any condition that causes hardware failure, software failure, firmware failure, or any combination thereof that prevents the underlying entity from operating as intended. "Entity" as used herein means a virtual machine, a container, a software application, a volume group, or any other element or resource of an availability zone that is desired to be replicated from one availability zone to another availability zone for backup and/or for maintaining continuity of operation. Also as used herein, an "availability zone" means a datacenter implementing a virtual computing system as described herein, a portion of a datacenter, a group of datacenters, or any aggregate of computing systems that are configured for providing protection of resources.

Conventionally, when a disaster condition is detected, impacted clusters from one availability zone are migrated to another availability zone for operation until the disaster condition is resolved. Upon the resolution of the disaster condition, the clusters may be migrated back to the original availability zone and/or continue operation from the new availability zone. Thus, conventionally, disaster conditions are handled at the granularity of clusters. As indicated above, each cluster typically includes multiple entities such as virtual machines. Often, groups of entities are specifically designated to perform a category of operations. These entities performing a category of operations may be spread out across multiple clusters.

Simply as an example and without intending to be limiting in any way, an enterprise organization may have multiple departments such as a human resources department, an engineering department, an accounting department, a maintenance department, and so on. Each of these departments may be designated certain entities (e.g., virtual machines) to perform the operations of that department. These entities are typically not all installed on a single cluster, and may be spread out across multiple clusters of an availability zone and possibly across multiple availability zones.

Conventionally, to protect a particular category of entities (e.g., entities performing a particular category of operations), a protection policy is defined for each cluster that these entities reside on. Thus, to protect a category of entities spread across multiple clusters, multiple protection policies exist, with each protection policy applying to one cluster. As the number of clusters increases, the number of protection policies increases as well, making tracking and maintenance of those protection policies cumbersome and inefficient. If another entity (performing the same category of operations) is added to a new cluster, a new protection policy needs to be defined for that new cluster.

Further, in such cases where a category of entities is spread across multiple clusters of one or more availability zones, to protect those entities, a user first needs to identify all of the clusters on which those entities reside, and then replicate each cluster to a second availability zone. On the second availability zone, new protection policies need to be defined for those clusters where the entities are replicated to. Thus, protecting entities across multiple availability zones is inefficient, takes time, and is cumbersome. Further, since the protection is at the cluster level and each cluster may have entities spanning multiple categories, when that cluster is replicated to protect a certain category of entities, the other category of entities are also replicated regardless of whether there is a need to replicate those other category of entities at the time or not. Thus, the protection cannot be customized at the entity level. Therefore, the conventional mechanism of protecting entities is slow, inefficient, and simply does not work in many scenarios.

The present disclosure provides technical solutions. For example, the present disclosure provides improvements in computer related technology that allow defining protection policies at the entity level. Each entity is assigned a tag, and all entities having a common tag are protected under a single protection policy regardless of the cluster or availability zone that those entities are located on. The protection policies are distributed (e.g., synchronized) amongst all of the availability zones identified in the protection policy such that as the tagged entities move across availability zones, the protection policy follows the tagged entities. The protection policy of the present disclosure is flexible in that the same protection policy may be used to apply to a first group of entities having a first tag, as well as to a second group of entities having a different tag. The protection policy may also be set up such that a particular group of tagged entities from a source availability zone is replicated to multiple destination availability zones.

The present disclosure, thus, provides a policy engine that receives data from a user and creates a protection policy definition based on that data. The data may identify the entities (e.g., from the tags) that are to be protected under a particular protection policy definition, the location of the source availability zone, the location of the destination availability zone(s), as well as other parameters described herein. The policy engine may also periodically update the protection policy definition based on the conditions programmed therein. When a new entity is added (regardless of which cluster that entity is created on), the user may simply assign that entity a tag and that entity is automatically protected by the protection policy definition that applies to that tag. Thus, protecting newly added entities is easy and efficient.

It is to be understood that the present disclosure is described mostly with respect to protecting virtual machines. However, the present disclosure is also applicable to other types of entities defined herein that are desired to be protected, including for example clusters, containers, and databases. Further, the present disclosure is described with respect to an availability zone being a datacenter. However, the present disclosure is also applicable to other types of availability zones, as defined above. Additionally, "protecting" an entity as used herein means replicating or copying the entity or at least a portion of data of the entity from one availability zone to another availability zone, or in other words, creating a back-up of that entity or migrating that entity from one availability zone to another availability zone.

Referring now to FIG. 1, a cluster 100 of a virtual computing system is shown, in accordance with some embodiments of the present disclosure. The cluster 100 includes a plurality of nodes, such as a first node 105, a second node 110, and a third node 115. Each of the first node 105, the second node 110, and the third node 115 may also be referred to as a "host" or "host machine." The first node 105 includes user virtual machines ("user VMs") 120A and 120B (collectively referred to herein as "user VMs 120"), a hypervisor 125 configured to create and run the user VMs, and a controller/service VM 130 configured to manage, route, and otherwise handle workflow requests between the various nodes of the cluster 100. Similarly, the second node 110 includes user VMs 135A and 135B (collectively referred to herein as "user VMs 135"), a hypervisor 140, and a controller/service VM 145, and the third node 115 includes user VMs 150A and 150B (collectively referred to herein as "user VMs 150"), a hypervisor 155, and a controller/service VM 160. The controller/service VM 130, the controller/service VM 145, and the controller/service VM 160 are all connected to a network 165 to facilitate communication between the first node 105, the second node 110, and the third node 115. Although not shown, in some embodiments, the hypervisor 125, the hypervisor 140, and the hypervisor 155 may also be connected to the network 165.

The cluster 100 also includes and/or is associated with a storage pool 170. The storage pool 170 may include network-attached storage 175 and direct-attached storage 180A, 180B, and 180C. The network-attached storage 175 is accessible via the network 165 and, in some embodiments, may include cloud storage 185, as well as local storage area network 190. In contrast to the network-attached storage 175, which is accessible via the network 165, the direct-attached storage 180A, 180B, and 180C includes storage components that are provided internally within each of the first node 105, the second node 110, and the third node 115, respectively, such that each of the first, second, and third nodes may access its respective direct-attached storage without having to access the network 165.

It is to be understood that only certain components of the cluster 100 are shown in FIG. 1. Nevertheless, several other components that are needed or desired in the cluster 100 to perform the functions described herein are contemplated and considered within the scope of the present disclosure.

Although three of the plurality of nodes (e.g., the first node 105, the second node 110, and the third node 115) are shown in the cluster 100, in other embodiments, greater than or fewer than three nodes may be used. Likewise, although only two of the user VMs (e.g., the user VMs 120, the user VMs 135, and the user VMs 150) are shown on each of the respective first node 105, the second node 110, and the third node 115, in other embodiments, the number of the user VMs on each of the first, second, and third nodes may vary to include either a single user VM or more than two user VMs. Further, the first node 105, the second node 110, and the third node 115 need not always have the same number of the user VMs (e.g., the user VMs 120, the user VMs 135, and the user VMs 150).

In some embodiments, each of the first node 105, the second node 110, and the third node 115 may be a hardware device, such as a server. For example, in some embodiments, one or more of the first node 105, the second node 110, and the third node 115 may be an NX-1000 server, NX-3000 server, NX-6000 server, NX-8000 server, etc. provided by Nutanix, Inc. or server computers from Dell, Inc., Lenovo Group Ltd. or Lenovo PC International, Cisco Systems, Inc., etc. In other embodiments, one or more of the first node 105, the second node 110, or the third node 115 may be another type of hardware device, such as a personal computer, an input/output or peripheral unit such as a printer, or any type of device that is suitable for use as a node within the cluster 100. In some embodiments, the cluster 100 may be part of a data center.

Each of the first node 105, the second node 110, and the third node 115 may also be configured to communicate and share resources with each other via the network 165. For example, in some embodiments, the first node 105, the second node 110, and the third node 115 may communicate and share resources with each other via the controller/service VM 130, the controller/service VM 145, and the controller/service VM 160, and/or the hypervisor 125, the hypervisor 140, and the hypervisor 155. One or more of the first node 105, the second node 110, and the third node 115 may be organized in a variety of network topologies.

Also, although not shown, one or more of the first node 105, the second node 110, and the third node 115 may include one or more processing units configured to execute instructions. The instructions may be carried out by a special purpose computer, logic circuits, or hardware circuits of the first node 105, the second node 110, and the third node 115. The processing units may be implemented in hardware, firmware, software, or any combination thereof. The term "execution" is, for example, the process of running an application or the carrying out of the operation called for by an instruction. The instructions may be written using one or more programming language, scripting language, assembly language, etc. The processing units, thus, execute an instruction, meaning that they perform the operations called for by that instruction.

The processing units may be operably coupled to the storage pool 170, as well as with other elements of the first node 105, the second node 110, and the third node 115 to receive, send, and process information, and to control the operations of the underlying first, second, or third node. The processing units may retrieve a set of instructions from the storage pool 170, such as, from a permanent memory device like a read only memory ("ROM") device and copy the instructions in an executable form to a temporary memory device that is generally some form of random access memory ("RAM"). The ROM and RAM may both be part of the storage pool 170, or in some embodiments, may be separately provisioned from the storage pool. Further, the processing units may include a single stand-alone processing unit, or a plurality of processing units that use the same or different processing technology.

With respect to the storage pool 170 and particularly with respect to the direct-attached storage 180A, 180B, and 180C, each of the direct-attached storage may include a variety of types of memory devices. For example, in some embodiments, one or more of the direct-attached storage 180A, 180B, and 180C may include, but is not limited to, any type of RAM, ROM, flash memory, magnetic storage devices (e.g., hard disk, floppy disk, magnetic strips, etc.), optical disks (e.g., compact disk ("CD"), digital versatile disk ("DVD"), etc.), smart cards, solid state devices, etc. Likewise, the network-attached storage 175 may include any of a variety of network accessible storage (e.g., the cloud storage 185, the local storage area network 190, etc.) that is suitable for use within the cluster 100 and accessible via the network 165. The storage pool 170, including the network-attached storage 175 and the direct-attached storage 180A, 180B, and 180C, together form a distributed storage system configured to be accessed by each of the first node 105, the second node 110, and the third node 115 via the network 165, the controller/service VM 130, the controller/service VM 145, the controller/service VM 160, and/or the hypervisor 125, the hypervisor 140, and the hypervisor 155. In some embodiments, the various storage components in the storage pool 170 may be configured as virtual disks for access by the user VMs 120, the user VMs 135, and the user VMs 150.

Each of the user VMs 120, the user VMs 135, and the user VMs 150 is a software-based implementation of a computing machine. The user VMs 120, the user VMs 135, and the user VMs 150 emulate the functionality of a physical computer. Specifically, the hardware resources, such as processing unit, memory, storage, etc., of the underlying computer (e.g., the first node 105, the second node 110, and the third node 115) are virtualized or transformed by the respective hypervisor 125, the hypervisor 140, and the hypervisor 155, into the underlying support for each of the user VMs 120, the user VMs 135, and the user VMs 150 that may run its own operating system and applications on the underlying physical resources just like a real computer. By encapsulating an entire machine, including CPU, memory, operating system, storage devices, and network devices, the user VMs 120, the user VMs 135, and the user VMs 150 are compatible with most standard operating systems (e.g. Windows, Linux, etc.), applications, and device drivers. Thus, each of the hypervisor 125, the hypervisor 140, and the hypervisor 155 is a virtual machine monitor that allows a single physical server computer (e.g., the first node 105, the second node 110, third node 115) to run multiple instances of the user VMs 120, the user VMs 135, and the user VMs 150, with each user VM sharing the resources of that one physical server computer, potentially across multiple environments. For example, each of the hypervisor 125, the hypervisor 140, and the hypervisor 155 may allocate memory and other resources to the underlying user VMs (e.g., the user VMs 120, the user VMs 135, and the user VMs 150) from the storage pool 170 to perform one or more functions.

By running the user VMs 120, the user VMs 135, and the user VMs 150 on each of the first node 105, the second node 110, and the third node 115, respectively, multiple workloads and multiple operating systems may be run on a single piece of underlying hardware computer (e.g., the first node, the second node, and the third node) to increase resource utilization and manage workflow. When new user VMs are created (e.g., installed) on the first node 105, the second node 110, and the third node 115, each of the new user VMs may be configured to be associated with certain hardware resources, software resources, storage resources, and other resources within the cluster 100 to allow those virtual VMs to operate as intended. In some embodiments, each new and existing user VM may be assigned a tag.

In some embodiments, the tag may be represented by a name-value pair. For example, the "name" in the name-value pair may be representative of a category to which the user VM belongs. An example category may be "department." As indicated above, an enterprise organization may include multiple divisions or departments, such as engineering, finance, human resources, accounting and payroll, etc. The "value" in the name-value pair of the tag may identify the type of department. Therefore, a tag of a user VM may be, for example, Department:Finance. In other embodiments, the "name" in the name-value pair of the tag may be representative of other types of categories as desired and the "value" in the name-value pair may be representative of an instance or value of the category represented by the "name." In some embodiments, tags may be color coded, such that each color may be associated with a specific name-value pair. Thus, each user VM (e.g., the user VMs 120, the user VMs 135, and the user VMs 150) on a particular node may be assigned a tag. All of the user VMs that have the same tag are managed by the same protection policy definition regardless of whether those user VMs are part of the same cluster or different clusters. Further, by virtue of implementing the protection policy definition based on tags, new user VMs may be easily and conveniently added to existing protection policy definitions by assigning those user VMs tags associated with the existing protection policy definitions.

It is to be understood that using a tag to categorize user VMs is only an example. In other embodiments, other mechanisms may be used to categorize a user VM and differentiate that user VM from other user VMs.

The user VMs 120, the user VMs 135, the user VMs 150, and any newly created instances of the user VMs are controlled and managed by their respective instance of the controller/service VM 130, the controller/service VM 145, and the controller/service VM 160. The controller/service VM 130, the controller/service VM 145, and the controller/service VM 160 are configured to communicate with each other via the network 165 to form a distributed system 195. Each of the controller/service VM 130, the controller/service VM 145, and the controller/service VM 160 may be considered a local management system configured to manage various tasks and operations within the cluster 100. For example, in some embodiments, the local management system may perform various management related tasks on the user VMs 120, the user VMs 135, and the user VMs 150.

The hypervisor 125, the hypervisor 140, and the hypervisor 155 of the first node 105, the second node 110, and the third node 115, respectively, may be configured to run virtualization software, such as, ESXi from VMWare, AHV from Nutanix, Inc., XenServer from Citrix Systems, Inc., etc. The virtualization software on the hypervisor 125, the hypervisor 140, and the hypervisor 155 may be configured for running the user VMs 120, the user VMs 135, and the user VMs 150, respectively, and for managing the interactions between those user VMs and the underlying hardware of the first node 105, the second node 110, and the third node 115. Each of the controller/service VM 130, the controller/service VM 145, the controller/service VM 160, the hypervisor 125, the hypervisor 140, and the hypervisor 155 may be configured as suitable for use within the cluster 100.

The network 165 may include any of a variety of wired or wireless network channels that may be suitable for use within the cluster 100. For example, in some embodiments, the network 165 may include wired connections, such as an Ethernet connection, one or more twisted pair wires, coaxial cables, fiber optic cables, etc. In other embodiments, the network 165 may include wireless connections, such as microwaves, infrared waves, radio waves, spread spectrum technologies, satellites, etc. The network 165 may also be configured to communicate with another device using cellular networks, local area networks, wide area networks, the Internet, etc. In some embodiments, the network 165 may include a combination of wired and wireless communications.

Referring still to FIG. 1, in some embodiments, one of the first node 105, the second node 110, or the third node 115 may be configured as a leader node. The leader node may be configured to monitor and handle requests from other nodes in the cluster 100. For example, a particular user VM (e.g., the user VMs 120, the user VMs 135, or the user VMs 150) may direct an input/output request to the controller/service VM (e.g., the controller/service VM 130, the controller/service VM 145, or the controller/service VM 160, respectively) on the underlying node (e.g., the first node 105, the second node 110, or the third node 115, respectively). Upon receiving the input/output request, that controller/service VM may direct the input/output request to the controller/service VM (e.g., one of the controller/service VM 130, the controller/service VM 145, or the controller/service VM 160) of the leader node. In some cases, the controller/service VM that receives the input/output request may itself be on the leader node, in which case, the controller/service VM does not transfer the request, but rather handles the request itself.

The controller/service VM of the leader node may fulfil the input/output request (and/or request another component within/outside the cluster 100 to fulfil that request). Upon fulfilling the input/output request, the controller/service VM of the leader node may send a response back to the controller/service VM of the node from which the request was received, which in turn may pass the response to the user VM that initiated the request. In a similar manner, the leader node may also be configured to receive and handle requests (e.g., user requests) from outside of the cluster 100. If the leader node fails, another leader node may be designated.

Additionally, in some embodiments, although not shown, the cluster 100 is associated with a central management system that is configured to manage and control the operation of multiple clusters in the virtual computing system. In some embodiments, the central management system may be configured to communicate with the local management systems on each of the controller/service VM 130, the controller/service VM 145, the controller/service VM 160 for controlling the various clusters.

Again, it is to be understood again that only certain components and features of the cluster 100 are shown and described herein. Nevertheless, other components and features that may be needed or desired to perform the functions described herein are contemplated and considered within the scope of the present disclosure. It is also to be understood that the configuration of the various components of the cluster 100 described above is only an example and is not intended to be limiting in any way. Rather, the configuration of those components may vary to perform the functions described herein.

Figure 2:
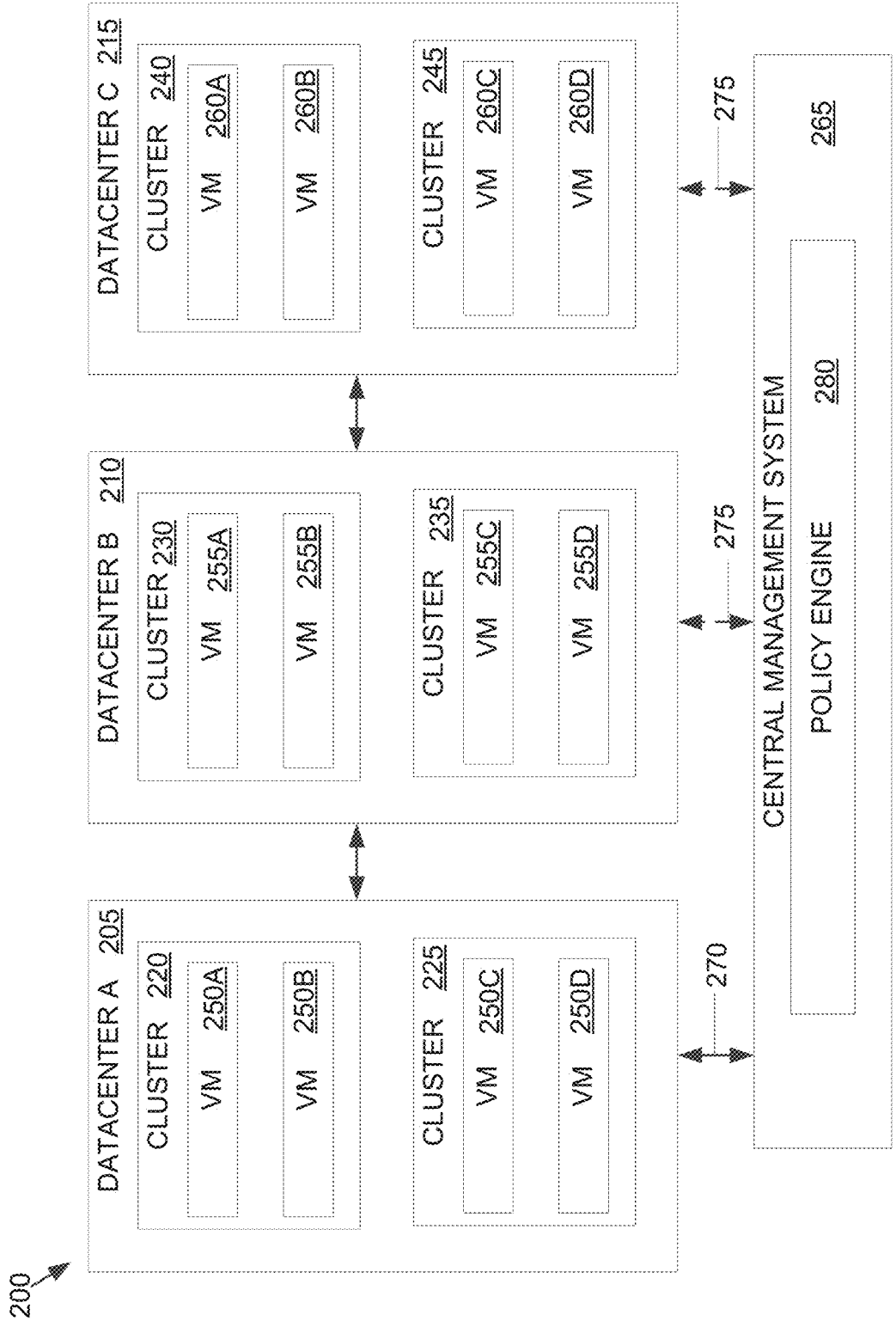
FIG. 2 is an example block diagram of a protection system of the virtual computing system, in accordance with some embodiments of the present disclosure.

Turning to FIG. 2, an example block diagram of a protection system 200 is shown, in accordance with some embodiments of the present disclosure. The protection system 200 includes a first datacenter 205, a second datacenter 210, and a third datacenter 215 that are operatively associated with one another. Each of the first datacenter 205, the second datacenter 210, and the third datacenter 215 may be a private or an enterprise datacenter that is associated with a particular company or organization to house that company or organization's computer systems, servers, storage and network components, power supplies, backup devices, and other equipment to store, manage, process, and backup data or otherwise perform the computing operations of that company or organization. In other embodiments, instead of being an enterprise datacenter, one or more of the first datacenter 205, the second datacenter 210, and the third datacenter 215 may be a general, internet facing, or public datacenter. Further, each of the first datacenter 205, the second datacenter 210, and the third datacenter 215 may constitute an availability zone. In other words, the first datacenter 205, the second datacenter 210, and the third datacenter 215 may be communicably connected with one another to provide backup capabilities to one another. Thus, entities (e.g., virtual machines) of one datacenter may be replicated on another associated datacenter, such that if the original datacenter goes down (e.g., due to a disaster condition), the continuity of operations may be maintained using the replicated entity from the another datacenter. Each of the first datacenter 205, the second datacenter 210, and the third datacenter 215 may be a source datacenter for entities residing thereon, as well as a destination datacenter to receive replicated entities originally stored on the source datacenter. Thus, each of the first datacenter 205, the second datacenter 210, and the third datacenter 215 works collaboratively to ensure availability of entities at all times. Further, the first datacenter 205, the second datacenter 210, and the third datacenter 215 may be in the same geographical location or in geographically remote (e.g., in separate) locations.

Although only three datacenters (e.g., the first datacenter 205, the second datacenter 210, and the third datacenter 215) are shown in FIG. 2, greater than or fewer than three datacenters associated with one another may be provided in other embodiments. Generally speaking, the number of datacenters in the protection system 200 may depend upon the number of datacenters that are associated with a particular company or organization and/or the number of availability zones that are desired.

Each of the first datacenter 205, the second datacenter 210, and the third datacenter 215 includes one or more clusters, and each of the one or more clusters includes one or more virtual machines. For example, the first datacenter 205 includes clusters 220 and 225, the second datacenter 210 includes clusters 230 and 235, while the third datacenter 215 includes clusters 240 and 245. The cluster 220 includes virtual machines 250A and 250B, the cluster 225 includes virtual machines 250C and 250D, the cluster 230 includes virtual machines 255A and 255B, the cluster 235 includes virtual machines 255C and 255D, the cluster 240 includes virtual machines 260A and 260B, while the cluster 245 includes virtual machines 260C and 260D. Each of the clusters 220-245 is similar to the cluster 100 of FIG. 1. Similarly, each of the virtual machines 250A-260B is similar to the virtual machines within the cluster 100, as discussed above. Additionally, although each of the clusters 220-245 has been shown in FIG. 2 as having only the virtual machines (e.g., the virtual machines 250A-260B), the clusters are intended to include other components as described above in FIG. 1 with respect to the cluster 100. One or more of the clusters 220-245 may also include one or more containers and other components.

Although each of the first datacenter 205, the second datacenter 210, and the third datacenter 215 has been shown as having two clusters (e.g., the clusters 220/225, 230/235, 240/245), in other embodiments, the number of clusters in each of the datacenters may vary to be greater than or fewer than two. The number of clusters in each of the first datacenter 205, the second datacenter 210, and the third datacenter 215 may be same or different. Likewise, although each of the clusters (e.g., the clusters 220-245) has been shown as having two virtual machines (e.g., the virtual machines 250A/250B, 250C/250D, 255A/255B, 255C/255D, 260A/260B, 260C/260D), the number of virtual machines on each of the clusters may vary, with each cluster having the same or different number of virtual machines as another cluster. Further, the virtual machines that are part of a cluster are configured to share resources with each other. In some embodiments, multiple clusters within the same datacenter and/or in separate datacenters may share resources with one another as well.

Further, although each of the first datacenter 205, the second datacenter 210, and the third datacenter 215 has been shown as having only the clusters (e.g., the clusters 220-245) and the virtual machines (e.g., the virtual machines 250A-260B) thereon, each of those datacenters may have other equipment, infrastructure, components, and/or features such as power sources and generators, security devices, surveillance/monitoring systems, network interfaces, heating, ventilation, and air conditioning (HVAC) systems, and any other element that may be needed or considered desirable to have to operate those datacenters and perform the functions described herein.

The protection system 200 also includes a central management system (also referred to herein as "overall management system") 265. The central management system 265, in some embodiments, is the Prism Central component from Nutanix, Inc. The central management system 265 is configured to manage all clusters associated with a particular datacenter. For example, as shown in FIG. 2 via a solid line 270, the central management system 265 is configured to manage the clusters 220, 225 of the first datacenter 205. Thus, although not shown, each of the second datacenter 210 and the third datacenter 215 may also be associated with a respective central management system similar to the central management system 265 to manage the clusters thereon. In other embodiments, the central management system 265 may be configured to be associated with and manage the clusters on the second datacenter 210 and/or the third datacenter 215 as well.

Further, even when not specifically configured to manage the second datacenter 210 and the third datacenter 215, the central management system 265 may be configured to connect to the second and the third datacenters, as shown by dashed lines 275. In some embodiments, the central management system 265 may connect to the second datacenter 210 and the third datacenter 215 via the first datacenter 205. In other embodiments, the central management system 265 may be configured to directly connect to the second datacenter 210 and the third datacenter 215 (e.g., via the central management systems of the second and third datacenters or via another mechanism). By being able to connect to the second datacenter 210 and/or the third datacenter 215, the central management system 265 may be able to transfer information to those datacenters, receive information from those datacenters, view data stored on those datacenters, etc.

Since the central management system 265 is associated with the first datacenter 205, the central management system may be installed on a virtual machine running on one of the clusters (e.g., the clusters 220, 225) of the first datacenter. In some embodiments, the central management system 265 may be configured as a separate node/cluster in the first datacenter 205. To manage the clusters 220 and 225 within the first datacenter 205, the central management system 265 may communicate with the local management system of a particular node of those clusters. In other embodiments, the central management system 265 may communicate with the local management system on the leader node or a local management system designated to communicate with the central management system, which in turn may then communicate with other nodes within the cluster to perform operations requested by the central management system. Similarly, the central management system 265 may communicate with the central management system and/or the local management systems of the second datacenter 210 and the third datacenter 215 to establish communication with those datacenters. The central management system 265 may also receive information from the various components of each cluster through the local management system. For example, the virtual machines 250A may transmit information to their underlying instance of the local management system, which may then transmit that information either directly to the central management system 265 or to the leader local management system, which may then transmit all of the collected information to the central management system.

The central management system 265 also includes a policy engine 280. By virtue of being associated with the central management system 265, the policy engine 305 is also associated with the components that the central management system is associated with. Thus, the policy engine 305 is also associated with (e.g., connected to receive, send, and otherwise share information) the first datacenter 205. Although the policy engine 280 has been shown as being part of the central management system 265, in some embodiments, the policy engine may be part of another component of the datacenter (e.g., the first datacenter 205) and operably connected to the central management system. In some embodiments, the policy engine 280 or at least portions of the policy engine may be stored remotely (e.g., on a cloud) and communicably connected to the central management system 265.

Since the policy engine 280 is associated with the first datacenter 205, the policy engine is configured to create and implement a protection policy definition for entities of the first datacenter. Thus, the first datacenter 205 may be considered the source datacenter (or source availability zone). The protection policy definition may identify either or both of the second datacenter 210 and the third datacenter 215 as the destination datacenters (or destination availability zones). As explained below, the policy engine 280 may synchronize the protection policy definition of the entities on the first datacenter 205 with the destination datacenters (e.g., the second datacenter 210 and/or the third datacenter 215) such that all datacenters identified in the protection policy definition have a copy of the protection policy definition. Even though the policy engine 280 is shown as only indirectly associated with the second datacenter 210 and/or the third datacenter 215, in some embodiments, the policy engine 280 may be configured to create a protection policy definition for entities on the second datacenter and/or the third datacenter as well, and synchronize that protection policy definition with the other datacenters identified in the protection policy definition.

Figure 3:
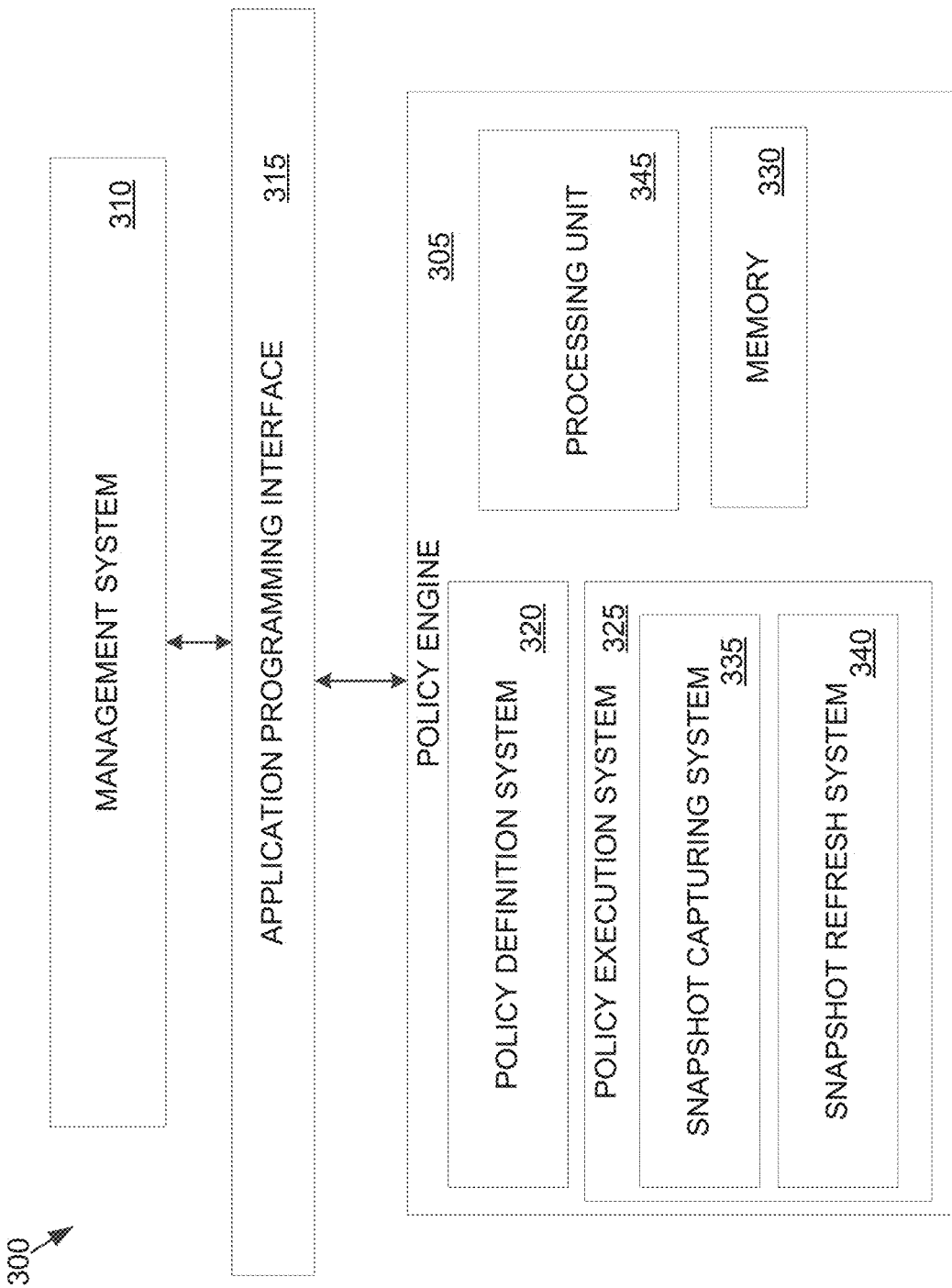
FIG. 3 is another example block diagram of a portion of the protection system of FIG. 2, in accordance with some embodiments of the present disclosure.

Referring now to FIG. 3, an example block diagram of a portion of a protection system 300 is shown, in accordance with some embodiments of the present disclosure. The protection system 300 is discussed in conjunction with FIG. 2 above. The protection system 300 may be considered utility software that is configured to create and implement the protection policy definition. Thus, the protection system 300 includes a policy engine 305 that is configured to receive information or data from a user to create the protection policy definition, synchronize the protection policy definition on all datacenters or availability zones identified by the user, and replicate entities on the availability zones. The policy engine 305 is communicably connected to a management system 310 via an application programming interface ("API") 315. A user provides data to the policy engine 305 for creating the protection policy definition and monitors/manages the policy engine via the management system 310.

The policy engine 305 includes a policy definition system 320 and a policy execution system 325. The policy definition system 320 receives the data from the user, stores the data within a memory 330 of the policy engine, parses the data to create a protection policy definition, synchronizes the protection policy definition with other datacenters (e.g., availability zones), and makes the protection policy definition available to the policy execution system 325. Thus, the policy definition system 320 is configured to request, receive, maintain, and update the protection policy definition. The policy execution system 325 implements the protection policy definition received from the policy definition system 320. The policy execution system 325 thus includes a snapshot capturing system 335 that takes snapshots, or in other words, replicates the entities mentioned in the protection policy definition, and a snapshot refresh system 340 that maintains an updated set of snapshots in accordance with the protection policy definition.

Although the policy definition system 320 and the policy execution system 325 are shown as separate components, in some embodiments, these components may be integrated together, and the integrated component may perform the functions of the separate components, as disclosed herein. Likewise, although the snapshot capturing system 335 and the snapshot refresh system 340 are shown as separate components, those components may be integrated together. Further, the policy engine 305, and particularly the policy definition system 320 and/or the policy execution system 325 of the policy engine may be configured as, and/or operate in association with, hardware, software, firmware, or a combination thereof. Specifically, the policy engine 305 may include a processing unit 345 configured to execute instructions for implementing the policy definition system 320 and the policy execution system 325, and the other functionalities of the policy engine 305. In some embodiments, each of the policy definition system 320 and the policy execution system 325 may have their own separate instance of the processing unit 345. The processing unit 345 may be implemented in hardware, firmware, software, or any combination thereof "Executing an instruction" means that the processing unit 345 performs the operations called for by that instruction.

The processing unit 345 may retrieve a set of instructions from a memory for execution. For example, in some embodiments, the processing unit 345 may retrieve the instructions from a permanent memory device like a read only memory (ROM) device and copy the instructions in an executable form to a temporary memory device that is generally some form of random access memory (RAM). The ROM and RAM may both be part of the memory 330, which in turn may be provisioned from the storage pool 170 of FIG. 1 in some embodiments. In other embodiments, the memory 330 may be separate from the storage pool 170 or only portions of the memory 330 may be provisioned from the storage pool. In some embodiments, the memory in which the instructions are stored may be separately provisioned from the storage pool 170 and/or the memory 330. The processing unit 345 may be a special purpose computer, and include logic circuits, hardware circuits, etc. to carry out those instructions. The processing unit 345 may include a single stand-alone processing unit, or a plurality of processing units that use the same or different processing technology. The instructions may be written using one or more programming language, scripting language, assembly language, etc.

Referring still to FIG. 3, as indicated above, the policy engine 305 may be managed and operated by the management system 310. The user (e.g., administrative personnel) may provide the data for creating the protection policy definition via the management system 310 as well. The policy engine 305 may form the back-end of the protection system 300, while the management system 310 may form the front-end of the protection system. The user may, via the management system 310, instruct the policy engine 305 to perform one or more operations. Example operations may include providing data to create new protection policy definitions, requesting updates to existing protection policy definitions, requesting to apply the protection policy definitions on demand, etc. Upon receiving instructions from the management system 310, the policy engine 305 may perform actions consistent with those instructions. Thus, the policy engine 305 is not visible to the user, but is rather configured to operate under control of the management system 310, which is visible to and operated by the user.

In some embodiments, the management system 310 may be installed on a device associated with the central management system (e.g., the central management system 265) and/or the local management system. In other embodiments, instead of or in addition to being installed on a particular device, the management system 310 may be hosted on a cloud service and may be accessed via the cloud. In some embodiments, the management system 310 may additionally or alternatively be configured as a mobile application that is suitable for installing on and access from a mobile computing device (e.g., a mobile phone). Thus, the management system 310 may be installed in a variety of ways.

Further, the management system 310 may be configured to access the policy engine 305 in a variety of ways. For example, in some embodiments, the management system 310 may be configured to access the policy engine 305 via the API 315. To access the policy engine 305 via the API 315, users may access the management system 310 via designated devices such as laptops, desktops, tablets, mobile devices, other handheld or portable devices, and/or other types of computing devices that are configured to access the API. These devices may be different from the device on which the policy engine 305 is installed.

In some embodiments and when the management system 310 is configured for use via the API 315, the users may access the policy engine 305 via a web browser and upon entering a uniform resource locator ("URL") for the API. Using the API 315, the users may then send instructions to the policy engine 305 and receive information back from the policy engine. In some embodiments, the API 315 may be a representational state transfer ("REST") type of API. In other embodiments, the API 315 may be any other type of web or other type of API (e.g., ASP.NET) built using any of a variety of technologies, such as Java, .Net, etc., that is capable of accessing the policy engine 305 and facilitating communication between the users and the policy engine.

In some embodiments, the API 315 may be configured to facilitate communication between the users via the management system 310 and the policy engine 305 via a hypertext transfer protocol ("HTTP") or hypertext transfer protocol secure ("HTTPS") type request. The API 315 may receive an HTTP/HTTPS request and send an HTTP/HTTPS response back. In other embodiments, the API 315 may be configured to facilitate communication between the management system 310 and the policy engine 305 using other or additional types of communication protocols. In other embodiments, the management system 310 may be configured to access the policy engine 305 in other ways.

Thus, the management system 310 provides a user interface that facilitates human-computer interaction between the users and the policy engine 305. Thus, the management system 310 is configured to receive user inputs from the users via a graphical user interface ("GUI") of the management system and transmit those user inputs to the policy engine 305. The management system 310 is also configured to receive outputs/information from the policy engine 305 and present those outputs/information to the users via the GUI of the management system. The GUI may present a variety of graphical icons, visual indicators, menus, visual widgets, and other indicia to facilitate user interaction. In other embodiments, the management system 310 may be configured as other types of user interfaces, including for example, text-based user interfaces and other man-machine interfaces. Thus, the management system 310 may be configured in a variety of ways.

Further, the management system 310 may be configured to receive user inputs in a variety of ways. For example, the management system 310 may be configured to receive the user inputs using input technologies including, but not limited to, a keyboard, a stylus and/or touch screen, a mouse, a track ball, a keypad, a microphone, voice recognition, motion recognition, remote controllers, input ports, one or more buttons, dials, joysticks, etc. that allow an external source, such as the user, to enter information into the management system. The management system 310 may also be configured to present outputs/information to the users in a variety of ways. For example, the management system 310 may be configured to present information to external systems such as users, memory, printers, speakers, etc.

Therefore, although not shown, the management system 310 may be associated with a variety of hardware, software, firmware components, or combinations thereof. Generally speaking, the management system 310 may be associated with any type of hardware, software, and/or firmware component that enables the policy engine 305 to perform the functions described herein and further enables a user to manage and operate the policy engine.

Figure 4B:
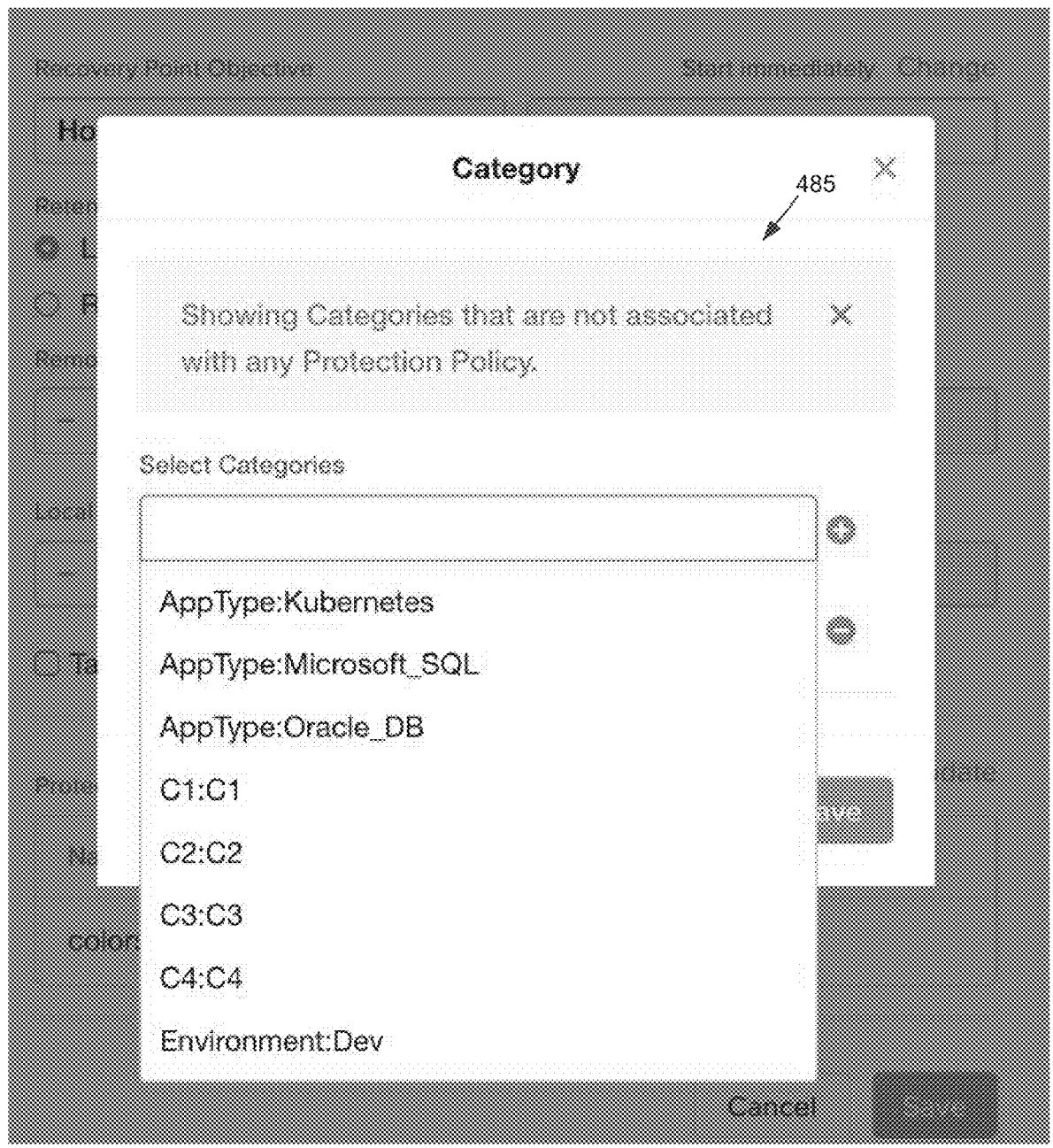
FIG. 4B is an example of a portion of the policy definition template of FIG. 4A, in accordance with some embodiments of the present disclosure.

Turning now to FIGS. 4A and 4B, examples of a policy definition template 400 for defining the protection policy definition are shown, in accordance with some embodiments of the present disclosure. FIGS. 4A and 4B are discussed in conjunction with FIGS. 2 and 3. The policy definition system 320 may present the policy definition template 400 to the user to solicit data to create a new, or update an existing, instance of the protection policy definition. Referring specifically to FIG. 4A, the policy definition template 400 includes a name field 405 for the user to assign the protection policy definition a name. The name may include alphabetic, numeric, alphanumeric and/or designated special characters. The policy definition template 400 also includes a primary location field 410 and a recovery location field 415. The primary location field 410 identifies a location of the source availability zone (e.g., datacenter) on which entities being replicated are located, while the recovery location field 415 identifies a location of the destination availability zone (e.g., datacenter) on which the entities from the source availability zone are replicated to. In other embodiments, other or additional fields to definitively identify the source availability zone and the destination availability zone may be provided on the policy definition template 400.

Although the policy definition template 400 includes a single primary location field (e.g., the primary location field 410) and a single recovery location field (e.g., the recovery location field 415), in some embodiments, multiple primary location fields and/or multiple recovery location fields may be provided in the policy definition template. For example and referring back to FIG. 2, if the entities being replicated are located on the first datacenter 205, the first datacenter is considered the source availability zone that would be identified in the primary location field 410. If the second datacenter 210 is the availability zone to which the entities from the first datacenter 205 are replicated to, the second datacenter is identified as the destination availability zone via the recovery location field 415. In some embodiments, the third datacenter 215 may also be designated as a destination availability zone, in which case another recovery location field 415 may be provided within the policy definition template 400 to identify the third datacenter. By virtue of providing the third datacenter 215 as an additional destination availability zone, the protection policy definition provides another layer of security such that if the second datacenter goes down, the replicated entities are available on the third datacenter. Thus, in some embodiments, a single primary location field (e.g., the primary location field 410) and one or more recovery location fields (e.g., the recovery location field 415) may be provided within the policy definition template 400.

In some embodiments, a single instance of the policy definition template 400 may be used to create a protection policy definition for multiple availability zones. For example and again referring back to FIG. 2, in addition to creating a protection policy definition (via the policy definition template 400) for replicating the entities from the first datacenter 205 to the second datacenter 210 and/or the third datacenter 215, the policy definition template 400 may also be used to create a protection policy definition for the entities on the second datacenter and/or the third datacenter. In such cases, additional sets of the primary location field 410 and one or more instances of the recovery location field 415 may be provided within the policy definition template 400. As an example, to create a protection policy definition for the second datacenter 210, another instance of the primary location field 410 may identify the second datacenter as the source availability zone, while one or more instance(s) of the recovery location field 415 may identify the first datacenter 205 and/or the third datacenter 215 as the destination availability zone(s).

In this way, the protection policy definitions may be made to follow the entities. For example, if the entities from the first datacenter 205 are replicated to the second datacenter 210, the policy definition template 400 may also identify how to protect those replicated entities on the second datacenter by providing the third datacenter 215 as the destination datacenter for the replicated entities. Thus, the policy definition template may provide a protection policy definition for protecting entities from the first datacenter 205 to the second datacenter 210, and from the second datacenter to the third datacenter 215. In some embodiments, the same policy definition template 400 may also be used to define a protection policy definition for the other entities located on the second datacenter 210 (e.g., the entities originally residing on, or in other words, not replicated from other datacenters).

Similarly, a set of the primary location field 410 and the recovery location field 415 may be provided for the third datacenter 215 as the source availability zone.

Thus, the policy definition template 400 may include multiple sets of the primary location field 410 and the recovery location field 415, with each primary location field identifying location of a source availability zone and being associated with one or more recovery location fields identifying location of one or more destination availability zones. Thus, a single instance of the policy definition template 400 may be used to define a protection policy for multiple availability zones. In other embodiments, a separate instance of the policy definition template 400 may be used for each set of source availability zone and destination availability zone(s).

The policy definition template 400 also includes a target cluster field 420. An instance of the target cluster field 420 may be provided for each instance of the recovery location field 415. Thus, if there are multiple destination availability zones, then multiple instances of the target cluster field 420 may be provided, with each target cluster field associated with one destination availability zone. Through the target cluster field 420, the user may designate a specific cluster in the destination availability zone identified via the recovery location field 415 to store the entity snapshots. For example, as shown via a drop down list, a user may select cluster "noche-3," represented by reference numeral 425, to store the entity snapshots in the destination availability zone. Instead of specifying a specific cluster to store the entity snapshots in, in some embodiments, the user may select an auto-select cluster (represented by reference numeral 430), which allows the policy engine 305 to decide which cluster in the destination availability zone to store the entity snapshots in.

The policy definition template 400 also solicits data regarding the frequency with which to capture snapshots, the number of snapshots to store at any given time, and identity of the entities on the source availability zone to create those snapshots. Thus, the policy definition template 400 includes a recovery point objective field 435 for identifying a recovery point objective parameter, a value of which identifies the frequency with which to create the snapshots. The recovery point objective field 435 may include sub-fields to select a unit of time via a unit of time field 440 and a value of the unit of time via a value field 445. For example, as shown in the policy definition template 400, the unit of time field 440 may be set to "hours" and the value field 445 may be set to "1." Thus, the policy definition template 400 requires that snapshots be captured every one hour. It is to be understood that these values in the unit if time field 440 and the value field 445 are only examples and may vary from one embodiment to another.

Further, a retention policy field 450 identifies the number of snapshots to be stored. The policy definition template 400 identifies two different types of retention policies: a linear policy 455 and a roll-up policy 460. The linear policy 455 may be configured to store no more than a particular number of snapshots at any given time. For example, if the linear policy 455 is pre-programmed to store twenty four snapshots, by selecting the linear policy, the policy engine 305 stores no more than twenty four snapshots at any given time, with each snapshot being captured in the frequency (e.g., one hour) indicated in the recovery point objective field 435. When the twenty fifth snapshot is captured (e.g., in the twenty fifth hour), the policy engine 305 may be programmed to delete one snapshot (e.g., the oldest snapshot) such that no more than twenty four snapshots are stored at any point in time. As noted below, in some cases, multiple copies of each snapshot captured at a particular time (e.g., time X) may be stored. In such cases, each snapshot is still counted as one for purposes of the linear policy 455. Thus, regardless of the number of copies of the snapshot that are captured and stored at time X, only a single copy is counted for purposes of the retention policy for time X.

In contrast, the roll-up policy 460 identifies a particular time frame within which to store snapshots. For example, the roll-up policy 460 may be pre-programmed with storing the snapshots captured within the last one week, one month, one hour, or in any other unit of time. The policy engine 305 may convert the time frame of the roll-up policy 460 into a schedule based upon the frequency identified in the recovery point objective field 435. For example, if the roll-up policy 460 is pre-programmed to store 2 days' worth of snapshots and the frequency identified in the recovery point objective field 435 is one hour, the policy engine 305 may convert that into a number of snapshots by multiplying the total number of hours in two days (48 hours) by the frequency (1 hour) such that no more than forty eight snapshots are stored at any given time, regardless of the number of copies that may be captured and stored at any given time.

Further, the policy definition template 400 includes a remote retention field 465 to identify a number of copies or sets of each snapshot to be stored on each destination availability zone (identified in the recovery location field 415) and a local retention field 470 to identify a number of copies of each snapshot to be stored on the source availability zone (identified in the primary location field 410).

The policy definition template 400 also includes an entity field 475 that identifies the tags of the entities on the source availability zone. An instance of the entity field 475 may be provided for each category of entities. Via the entity field 475, a tag, which identifies one or more entities, may be selected. The entities represented by that tag are thus to be replicated from the source availability zone to the destination availability zone(s). All entities having the same tag may be covered by the same protection policy definition, including entities existing at the time of creation of the protection policy definition and any entities created in the future having that tag. For example, as shown in the entity field 475, the entities represented by the color coded tag of blue are covered by the policy definition template 400. Thus, the entities tagged by the color blue are covered by the protection policy definition created from the policy definition template 400 regardless of the location of those entities on the availability zones and regardless of the creation time of those entities. As those entities are replicated from one availability zone to another, the protection policy definition still applies to those entities.

To add additional tags to the policy definition template 400 or to change the already added tags, the user may click on button 480 to update the tag list. Clicking on the button 480 opens a dialog box 485, shown in FIG. 4B. The dialog box 485 provides a listing of tags that are currently not covered by a protection policy definition. Each listing of tags may be associated with one or more entities. The user may select one or more of the tags to be added to the list of tags in the entity field 475. By selecting a tag from the dialog box 485, the user may select all of the entities having the selected tag to be covered by the protection policy definition created from the policy definition template 400 in a single click. Thus, regardless of the location of the entities, all entities having the same tag may be quickly and conveniently covered by the protection policy definition without having to create separate protection policy definitions for the entities.

The tags selected in the dialog box 485 are added to the list shown in the entity field 475.

Returning back to FIG. 4A, upon providing all of the information solicited in the policy definition template 400, the user may click on a save button 490 to save and send the policy definition template to the policy engine 305 for creating a protection policy definition or click on cancel button 495 to start again.

It is to be understood that the policy definition template 400 is only an example and one or more features shown and described herein may vary. For example, the order of the various fields, the format of the various fields, the size and shape of the font and other design features, etc. may vary from one embodiment to another. In some embodiments, some of the fields may be pre-filled with default values, which may or may not be allowed to be changed by the user. Other or additional fields may also be provided within the policy definition template 400 in other embodiments. Thus, the policy definition template 400 provides a form for the user to fill in a variety of information, which is then parsed and compiled by the policy engine 305 to create a protection policy definition.

Turning now to FIG. 5, an example flow chart outlining operations of a process 500 are shown, in accordance with some embodiments of the present disclosure. The process 500 may include additional, fewer, or different operations, depending on the particular embodiment. The process 500 is discussed in conjunction with FIGS. 3, 4A, and 4B, and is implemented by the policy engine 280 of the protection system 300. The process 500 starts at operation 505 with the policy definition system 320 sending and presenting the policy definition template 400 to the user via a user interface of the management system 310. The policy definition system 320 may send a blank (e.g., unfilled) instance of the policy definition template 400 to the user upon receiving a request from the user via the management system 310, upon receiving indication of creation of an entity having a new tag (e.g., a tag having a name or value in the name-value pair that is different from the existing tags), and/or based upon satisfaction of other conditions programmed within the policy definition system.

Upon receiving the policy definition template 400, the user may fill in the requested data (e.g., the fill in the fields shown in FIGS. 4A and 4B), and transmit the completed policy definition template back to the policy definition system 320. The policy definition system 320 receives the completed version of the policy definition template 400 from the user at operation 510. Upon receiving the completed version of the policy definition template 400, the policy definition system 320 may store the policy definition template within the memory 330 of the policy engine 305.

In some embodiments, the policy definition system 320 may be configured to periodically update an existing protection policy definition based upon conditions programmed therein. The policy definition system 320 may also receive a policy definition updating request from the user via the management system 310 to update an existing protection policy definition. The user request may identify the protection policy definition that is desired to be updated. For example, in the request, the user may include the name (e.g., the name filled in the name field 405) or other identifying information associated with the protection policy definition that is to be updated. Upon receiving the user request to update an existing instance of the protection policy definition or to periodically update the protection policy definition on its own accord, the policy definition system 320 may retrieve the existing filled copy of the policy definition template corresponding to the protection policy definition that is to be updated, from the memory 330. The policy definition system 320 may send the retrieved copy of the policy definition template to the user for updating. Upon receiving the updated policy definition template from the user, the policy definition system 320 may save the updated policy definition template within the memory 330.

The data filled in by the user within the policy definition template (whether in a new policy definition template or in an existing policy definition template) constitutes the protection policy definition to be implemented by the policy engine 305. To create the protection policy definition from the policy definition template, the policy definition system 320 extracts the data filled in by the user in the policy definition template. Thus, at operation 515, the policy definition system 320 parses the policy definition template received at the operation 510. To parse the policy definition template, the policy definition system 320 identifies (e.g., via character matching, etc.) various syntactic components from the policy definition template and compiles the identified syntactic components in a form readily understood by the policy execution system 325. Among other things, by parsing the policy definition template, the policy definition system 320 identifies the identity (e.g., location) of the source availability zone, identity (e.g., location) of the one or more destination availability zone, frequency with which to capture snapshots (e.g., value of the retention point objective parameter), frequency with which to refresh snapshots (e.g., type of retention policy), the tags and corresponding entities (e.g., virtual machines) protected by the protection policy definition, and any other information that may be considered useful or desirable for the policy execution system 325 to have. The aggregate of information extracted from the policy definition template 400 and compiled into a form understood by the policy execution system 325 forms the protection policy definition. The policy definition system 320 stores the protection policy definition within the memory 330.

At operation 520, the policy engine 305 synchronizes the protection policy definition with all of the availability zones (e.g., datacenters) indicated in the protection policy definition. In some embodiments, the policy definition system 320 may facilitate the synchronization, while in other embodiments, the policy execution system 325 or another component of the policy engine 305 may facilitate the synchronization. Further, in some embodiments, only the protection policy definition may be synchronized, while in other embodiments, the completed policy definition template from which the protection policy definition has been created may be synchronized as well. To synchronize the protection policy definition (and/or the policy definition template), the policy engine 305 which creates the protection policy definition (or at least receives the completed policy definition template from the user) may transfer the protection policy definition (and/or the policy definition template) to the underlying central management system (e.g., the central management system 265). The central management system may then transmit the protection policy definition (and/or the policy definition template) to all of the availability zones that are identified in the primary location field 410 and the recovery location field 415 of the policy definition template 400 such that all availability zones have a copy of the protection policy definition. When an existing protection policy definition is updated, the central management system may synchronize the updated protection policy definition (and/or the updated policy definition template) amongst the availability zones. In other embodiments, other mechanisms may be used to synchronize the protection policy definition amongst the availability zones identified in the protection policy definition.

Upon creating the protection policy definition, the protection policy definition may be implemented at operations 525-535. For example, at the operation 525, the policy execution system 325 retrieves the protection policy definition to be implemented or executed. In some embodiments, the policy execution system 325 may receive the protection policy definition directly from the policy definition system, 320, while in other embodiments the policy execution system may retrieve the protection policy definition from the memory 330. The policy execution system 325 is configured to implement the protection policy definition based on the information contained within the protection policy definition. The policy execution system 325 may implement the protection policy definition based on the value of the recovery point objective parameter in the protection policy definition. For example, if the value of the recovery point objective parameter indicates one hour, the policy execution system 325 implements (e.g., executes) the protection policy definition every one hour.

Further, the policy execution system 325 identifies the entities to which the protection policy definition applies (e.g., the entities being replicated), the location of those entities (e.g., either from the protection policy definition or from another source), the identity and location of the source availability zone and the destination availability zone(s), and any another information that is considered necessary or desirable for the policy execution system to have in executing the protection policy definition. The entities being replicated may be located on the same cluster or a different cluster of the source availability zone. As indicated above, all entities that have the same tag may be covered by one protection policy definition. Thus, at the operation 525, the policy execution system 325 creates snapshots of the entities being replicated.

A "snapshot" as used herein means a point in time image of the entity being replicated. Thus, the snapshot includes a complete encapsulation of the entity being replicated, including the configuration data of the entity, the user data, and any metadata associated with the entity. In some embodiments, the snapshot may identify the storage location (e.g., location in the storage pool 170) where the image of the entity is saved and replicate the location of the image within the destination datacenters. From the location of the image, the entity may be replicated. In other embodiments, an actual backup of the image (e.g., copy of the configuration of the entity, user data, metadata, and any other data of the entity being replicated) may be made, and the backed up image may be stored within the destination datacenters. Other manners of replicating the entity from the source availability zone to the destination availability zone(s) may be used in other embodiments. The snapshot capturing system 335 of the policy execution system 325 creates or captures snapshots of all of the entities being replicated on the source availability zone.

Upon capturing the snapshots of the entities, the snapshot capturing system 335 stores the snapshots at the operation 530. The snapshot capturing system 335 may store an instance of the captured snapshots on the source availability zone and/or on the destination availability zone(s) based upon the protection policy definition. For example, the remote retention field 465 and the local retention field 470 in the policy definition template identify the number of copies of the snapshots to be stored on the destination availability zone(s) and the source availability zone, respectively. Thus, based upon the protection policy definition, the snapshot capturing system 335 stores the snapshots captured at the operation 525 to create backup or replicated copies of the entities.

The snapshot capturing system 335 may store the snapshots on the source availability zone (e.g., the first datacenter 205) within the memory 330. To store the snapshots within the destination availability zone(s) (e.g., the second datacenter 210 and/or the third datacenter 215), the central management system (e.g., the central management system 265) with which the snapshot capturing system 335 is associated may establish a connection with the destination availability zone(s) and transfer the snapshots to the destination availability zone(s). By storing the snapshots of the entities from the source availability zone on the destination availability zone(s), the entities may be accessed from the destination availability zone(s) in case the source availability zone becomes non-operational. The location within the destination availability zone(s) where the snapshots are stored may be indicated within the target cluster field of the policy definition template 400. If a particular cluster is identified, the snapshots may be stored within that cluster. If no cluster is identified, the snapshot capturing system 335 may pick a cluster to store the snapshots based upon the conditions programmed within the snapshot capturing system 335. For example, in some embodiments, the snapshots may be stored within a cluster that meets a certain space requirement. In other embodiments, other criteria may be programmed within the snapshot capturing system 335 to select a destination cluster.

Since the snapshots are captured based upon the value (e.g., one hour) of the recovery point objective parameter, the number of snapshots that are stored for a particular one or group of entities may be customized based upon the retention policy indicated in the policy definition template. For example, the retention policy may indicate a particular number (e.g., twenty four) of snapshots to be stored for a particular one or group of entities. In such a case, the snapshot refresh system 340 may keep track (e.g., via a counter which may be incremented each time another snapshot is stored) of the number of snapshots that are stored for a particular one or group of entities. When the number of snapshots reaches the particular number (e.g., twenty four), the snapshot refresh system may update the list of stored snapshots by deleting the oldest snapshot. Thus, at given time, the number of snapshots that are stored on the source availability zone and/or the destination availability zone(s) corresponds to that particular number. Upon updating the list of snapshots, the process 500 returns to the operation 525 to continue making new snapshots and updating the list of snapshots.

It is to be understood that any examples used herein are simply for purposes of explanation and are not intended to be limiting in any way. It is also to be understood that any examples used herein are simply for purposes of explanation and are not intended to be limiting in any way. Further, although the present disclosure has been discussed with respect to memory usage, in other embodiments, the teachings of the present disclosure may be applied to adjust other resources, such as power, processing capacity, etc.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method comprising:
    creating, by a policy engine, a protection policy definition for replicating a first entity and a second entity of a first availability zone to a second availability zone, wherein each of the first entity and the second entity is associated with a first common tag, wherein the first common tag designates a common protection policy, and wherein the first entity and the second entity are located on separate clusters of the first availability zone;
    capturing, by the policy engine, a first snapshot of each of the first entity and the second entity in the first availability zone, wherein the first snapshot is captured in accordance with a first recovery point objective parameter; and
    storing, by the policy engine, a copy of the first snapshot in the second availability zone.

2. The method of claim 1, further comprising storing, by the policy engine, a copy of the first snapshot in a third availability zone.

3. The method of claim 1, further comprising storing, by the policy engine, a copy of the first snapshot in the first availability zone.

4. The method of claim 1, wherein the protection policy definition comprises a value of the first recovery point objective parameter, location of the first availability zone, location of the second availability zone, and identification of the first entity and the second entity.

5. The method of claim 1, wherein the protection policy definition further comprises location of a third availability zone to replicate a third entity and a fourth entity from the second availability zone, wherein each of the third entity and the fourth entity is associated with a second common tag designating a second common protection policy, and wherein the third entity and a fourth entity are located on separate clusters of the second availability zone.

6. The method of claim 5, further comprising:
    capturing, by the policy engine, a second snapshot of each of the third entity and the fourth entity in the second availability zone in accordance with a second recovery point objective parameter; and
    storing, by the policy engine, a copy of the second snapshot in the third availability zone.

7. The method of claim 5, wherein the first common tag includes a primary location and a recovery location.

8. The method of claim 5, wherein the third entity and the fourth entity includes the first snapshot of the first entity and the second entity stored in the second availability zone.

9. The method of claim 1, wherein the protection policy definition further comprises a target cluster on the second availability zone, and wherein the first snapshot is stored in the target cluster in the second availability zone.

10. The method of claim 1, wherein the protection policy definition further comprises a retention policy identifying a number of snapshots to store in the second availability zone for the first entity and the second entity, and wherein upon the number of the snapshots exceeding a value of the retention policy, the policy engine deletes at least one of the snapshots.

11. The method of claim 1, wherein the first common tag comprises a name-value pair, wherein the name in the name-value pair identifies a category of the first entity and the second entity, and wherein the value in the name-value pair identifies a value of the category.

12. The method of claim 1, wherein the protection policy definition identifies a third entity in the first availability zone, wherein the third entity comprises a second common tag, wherein the third entity is located on a third cluster separate from the clusters of the first entity and the second entity, and wherein the method further comprises:
capturing, by the policy engine, a second snapshot of the third entity in the first availability zone in accordance with a second recovery point objective parameter; and
storing, by the policy engine, a copy of the second snapshot in the second availability zone.

13. The method of claim 1, wherein the common protection policy includes a source location of source availability zone and a destination location of destination availability zone.

14. A system comprising:
a first availability zone and a second availability zone; and
a policy engine comprising:
a memory to store a protection policy definition; and
a processing unit configured to:
create the protection policy definition for replicating a first entity and a second entity of the first availability zone to the second availability zone, including storing the protection policy definition within the memory, wherein each of the first entity and the second entity is associated with a first common tag, wherein the first common tag designates a common protection policy, and wherein the first entity and the second entity are located on separate clusters of the first availability zone;
capture a first snapshot of each of the first entity and the second entity in the first availability zone, wherein the first snapshot is captured in accordance with a recovery point objective parameter; and
store a copy of the first snapshot in the second availability zone.

15. The system of claim 14, wherein each of the first availability zone and the second availability zone is a datacenter.

16. The system of claim 14, wherein the first entity and the second entity comprises at least one of a virtual machine and or a container.

17. The system of claim 14, further comprising a management system in operable communication with the policy engine, wherein the policy engine receives data via the management system, and wherein the policy engine creates the protection policy definition in accordance with the data.

18. The system of claim 17, wherein the data comprises identity of the first entity and the second entity, location of the first availability zone, location of the second availability zone, and a value of the recovery point objective parameter.

19. The system of claim 14, wherein the protection policy definition also applies for replicating a third entity in the second availability zone to a third availability zone.

20. The system of claim 14, wherein the common protection policy includes a source location of source availability zone and a destination location of destination availability zone.

21. A non-transitory computer readable media with computer-executable instructions embodied thereon that, when executed by a processor of a policy engine, cause the policy engine to perform a process comprising:
creating a protection policy definition for replicating a first entity and a second entity of a first availability zone to a second availability zone, wherein each of the first entity and the second entity is associated with a first common tag, wherein the first common tag designates a common protection policy, and wherein the first entity and the second entity are located on separate clusters of the first availability zone;
capturing a first snapshot of each of the first entity and the second entity in the first availability zone, wherein the first snapshot is captured in accordance with a first recovery point objective parameter; and
storing a copy of the first snapshot in the second availability zone.

22. The non-transitory computer readable media of claim 21, wherein the processor is further configured to store the first snapshot in the second availability zone for a time period identified via a retention policy parameter of the protection policy definition.

23. The non-transitory computer readable media of claim 21, wherein the common protection policy includes a source location of source availability zone and a destination location of destination availability zone.

24. The non-transitory computer readable media of claim 21, wherein the policy engine receives data via a management system, and wherein the policy engine creates the protection policy definition in accordance with the data.

25. The non-transitory computer readable media of claim 24, wherein the data comprises identity of the first entity and the second entity, location of the first availability zone, location of the second availability zone, and a value of the recovery point objective parameter.

26. The non-transitory computer readable media of claim 21, wherein the protection policy definition also applies for replicating a third entity in the second availability zone to a third availability zone.

* * * * *